United States Patent [19]
Ishiguro et al.

[11] Patent Number: 6,009,282
[45] Date of Patent: *Dec. 28, 1999

[54] BUILT-IN FLASH CAMERA

[75] Inventors: Minoru Ishiguro; Minoru Takahashi, both of Omiya, Japan

[73] Assignee: Fuji Photo Optical Co., Ltd., Saitama, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/924,121

[22] Filed: Sep. 5, 1997

Related U.S. Application Data

[63] Continuation of application No. 08/659,586, Jun. 6, 1996, abandoned.

[30] Foreign Application Priority Data

Jun. 13, 1995 [JP] Japan ................................ 7-146404

[51] Int. Cl.[6] ................ G03B 7/16; G03S 15/05
[52] U.S. Cl. ................................ 396/164; 396/161
[58] Field of Search ...................... 396/159, 161, 396/164–5, 169–170

[56] References Cited

U.S. PATENT DOCUMENTS

| | | | |
|---|---|---|---|
| 4,806,963 | 2/1989 | Kobayashi et al. | 354/415 |
| 5,005,042 | 4/1991 | Sato et al. | 354/412 |
| 5,255,047 | 10/1993 | Ishimaru et al. | 354/416 |
| 5,255,049 | 10/1993 | Akimoto et al. | 354/439 |
| 5,257,063 | 10/1993 | Ishimaru et al. | 354/416 |
| 5,311,238 | 5/1994 | Karasawa et al. | 354/413 |
| 5,343,268 | 8/1994 | Takahashi | 354/416 |
| 5,539,495 | 7/1996 | Katoh et al. | 354/412 |

*Primary Examiner*—Eddie C. Lee
*Assistant Examiner*—Michael Dalakis

[57] ABSTRACT

When a sensitivity of film used for photographing is less than a predetermined sensitivity, or when an external light brightness measured by a photometry means is more than a predetermined brightness, a strobe exposure is controlled to decrease gradually from 0 EV flash, wherein a standard strobe exposure can be obtained, to −1 EV to −2 EV to −2 EV . . . . On the other hand, when the external light brightness is less than the predetermined brightness, the 0 EV flash is performed compulsively regardless of the film sensitivity, and the ratio of the strobe exposure becomes high, so that the exposure contribution rate of the external light is relatively lowered. As a result, the spectral characteristics of the external light source have small effect on the image surface when the high-sensitivity film is used, and the color fading caused by the spectral characteristics of the external light source can be prevented.

18 Claims, 14 Drawing Sheets

OPENING
SHUTTER

STROBE
FLASHING

EXPOSURE

STROBE
FLASHING

EXPOSURE

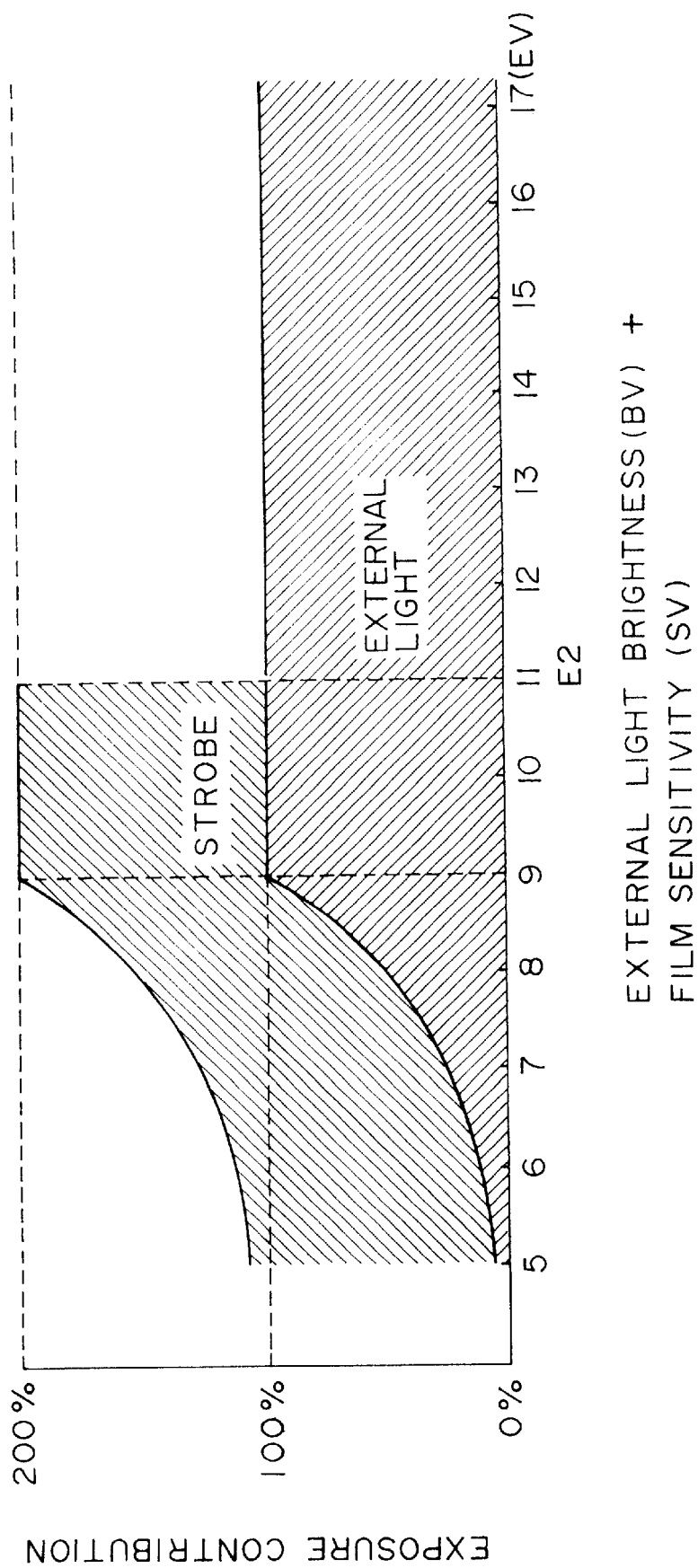

BUILT-IN FLASH CAMERA

This application is a continuation of application Ser. No. 08/659,586 filed on Jun. 6, 1996, now abandoned.

BACKGROUND OF THE INVENTION

1. Field of the Invention

The present invention relates to a built-in flash camera, and more particularly to a built-in flash camera provided with a function of automatic exposure and a strobe which flashes regularly for photographing under proper exposure.

2. Description of the Related Art

When a person is photographed against the light, their face looks dark because of the back light, or there is a shadow on their face when the sun is just above them even if there is not the back light. In order to eliminate the above-mentioned problem, there is known a method of flashing the strobe regularly even in the daylight, so that the strobe light can be added to the exposure by the external light. When a negative color film is used, it is preferable that the strobe always flashes, because its latitude is broad with regard to an overexposure. A Japanese Patent Application Laid-open No. 56-149022 discloses this kind of the built-in flash camera in which the strobe flashes regularly.

There is proposed another built-in flash camera, in which a focusing part for measuring a subject distance, and which gradually controls an exposure of the strobe in accordance with the external light brightness and the subject distance (refer to the specification of a Japanese Patent Application No. 6-255599). It is also proposed that the strobe exposure is changed in accordance with the an exposure value (EV) in view of a film sensitivity.

However, in the conventional built-in flash camera, an external light brightness (BV) for changing over the control of the strobe light is shifted according to different film sensitivities. Therefore, when the high-sensitivity color film is used, the exposure of the strobe light is decreased, and the color fades due to the strong influence by an external light source.

Specifically, when the high-sensitivity film is used, the photographing can be performed even in the external light of low brightness. The exposure required for photographing can be obtained even if a quantity of light flashed by the strobe is decreased. The above-mentioned photographing in the external light of low brightness is performed in a room for example, and is performed under the light from the external light source such as a fluorescent light in many cases. Since the photographing using high-sensitivity film is strongly influenced by the color of the external light source (fluorescent light), there is a problem in that the photograph is blue-tinged.

In the case of the photographing under the fluorescent light, the print tends to be green because of the spectral characteristics of the light source. The extent of the color fading varies according to the type of the light source.

SUMMARY OF THE INVENTION

The present invention has been developed in view of the above-described circumstances, and has its object the provision of a built-in flash camera which can prevent the color fading caused by an external light source, and can always reproduce the color satisfactorily.

In order to achieve the above-described object, the present invention includes: a photometry unit for measuring a brightness within a photographic visual field; a focusing unit means for measuring a distance up to a main subject within the photographic visual field; and an automatic exposure mechanism for opening and closing a diaphragm shutter so that a standard exposure can be obtained when the photographing is performed based on the brightness measured by the photometry means under an external light of much more brightness than a reference external light brightness. The reference external light brightness is an external light brightness wherein an optimum exposure can be obtained in a predetermined shutter opening time and an exposure in this case being the standard exposure. A strobe light control unit flashes regularly interlocking with the opening and closing of the shutter, and which controls the strobe light in accordance with the brightness measured by the photometry unit, an exposure determined by a sensitivity of film used for photographing, and the distance measured by the focusing unit; and the strobe light control unit controls the strobe exposure to be a reference strobe exposure when the brightness measured by the photometry unit is less than a predetermined brightness, the reference strobe exposure being a strobe exposure wherein an exposure required for photographing can be obtained by the strobe light only.

According to the present invention, the photometry unit measured the brightness within the photographic visual field, and the focusing unit measures the distance up to the main subject (a subject distance). The strobe exposure is controlled by the strobe light control unit in accordance with the sensitivity of the film used for photographing and an exposure value (EV) determined by the brightness within the photographic visual field, which is measured by the photometry unit. In this case, the reference strobe exposure is a strobe exposure when the strobe is controlled so that the exposure contribution by the external light can be eliminated and the exposure required for photographing can be obtained by the strobe light only. The strobe exposure is controlled by increasing and decreasing a quantity which the exposure decreases from the reference strobe exposure. Moreover, the above-mentioned control is performed in view of the distance up to the main subject (the subject distance) measured by the focusing unit, so the exposure is not overexposed even if the subject distance is near, and the exposure is not underexposed even if the subject distance is far. The strobe exposure is controlled to be the reference strobe exposure regardless of the film sensitivity when the brightness measured by the photometry unit is under the predetermined brightness.

Although the strobe changeover control is performed by EV interlock, the strobe exposure is purposely controlled to be the reference strobe exposure regardless of the film sensitivity. As a result, the ratio of the strobe exposure to the external light exposure can be high, and therefore the rate of the external light exposure contribution can be relatively lowered when the high-sensitivity film is used. Therefore, the effects of the spectral characteristics of the external light source can be reduced on the image, and the color fading caused by the spectral characteristics of the external light source can be prevented.

Specifically, as the exposure value increases, the strobe exposure is controlled to decrease gradually from the reference strobe exposure. On the other hand, on the condition that the contribution rate of the external light brightness is high and the ratio of the strobe exposure is low with regard to the total exposure when the sensitivity of the film used for photographing is higher than a predetermined value and the brightness measured by the photometry unit is less than a predetermined value, the strobe exposure is controlled to be kept at the reference strobe exposure. Thus, the strobe changeover control is performed by an EV interlock, and in particular, the strobe exposure is kept at the reference strobe exposure when the high-sensitivity film of the higher sensitivity than the predetermined one is used and the external light brightness is less than the predetermined value. As a result, the rate of the exposure contribution by the external light is lowered relatively. Therefore, the effects of the spectral characteristics of the external light source can be reduced on the image, and the color fading caused by the spectral characteristics of the external light source can be prevented.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 14 is a view illustrating a relationship between a strobe exposure and an external light exposure when a subject distance is D3 or more.

DETAILED DESCRIPTION OF THE PREFERRED EMBODIMENTS

Figure 1:
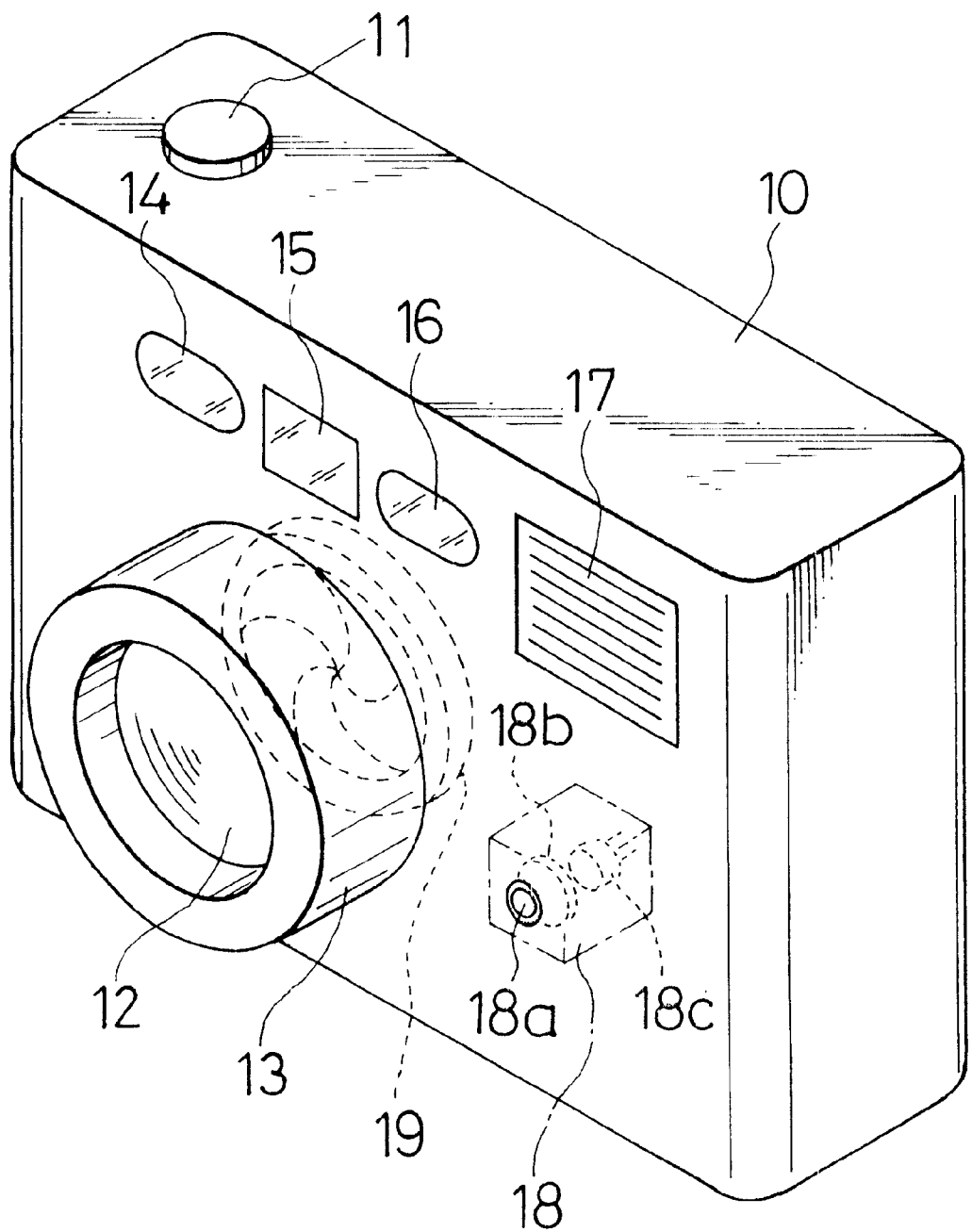
FIG. 1 is a perspective view illustrating an external appearance in an embodiment of a built-in flash camera according to the present invention.

FIG. 1 is a perspective view illustrating an external appearance in an embodiment of a built-in flash camera according to the present invention. In the built-in flash camera in FIG. 1, a shutter button 11 is arranged on a top surface of a camera body 10, and a mirror barrel 13, in which a taking lens 12 is incorporated, is attached at a central portion on a front surface of the camera body 10.

As shown in the FIG. 1, a light projector 14, a finder 15, a light acceptor 16, and a strobe 17 are arranged at an upper portion of the front surface of the camera body. The light projector 14 and the light acceptor 16 compose a focusing part which measures a distance from the camera to a main subject (for example, a person). The focusing part measures the distance based on, for example, a principle of triangulation.

A photometry part 18, which measures the brightness of the external light within the visual field, is provided at the right side of the mirror barrel 13 on the front surface of the camera body 10. The photometry part 18 is provided with an incident window 18a, which is formed on the surface of the camera body 10; a lens 18b, which is arranged within the incident window 18a; and a light accepting element 18c, in which a light accepting surface is arranged in a proximity of the image-forming position of the lens 18b.

The light accepting surface of the light accepting element 18c is arranged at a position displaced from an image-forming position of the lens 18b. Therefore, a perfect subject image is not formed on the light accepting surface of the light accepting element 18c, and an average quantity of the external light in the whole visual field including the main subject is detected by the light-accepting element 18c.

Furthermore, a shutter 19, which provides the film with the required exposure, is provided on the optical axis of the lens 12 within the camera body 10.

The strobe 17 automatically flashes in an open timing of the shutter 19. In this embodiment, the flash timing of the strobe 17 is slightly staggered from the open timing of the shutter 19, so that the exposure on the subject surface can be adjusted. The shutter 19 is a diaphragm shutter which serves as both a diaphragm and a shutter.

Figure 2A:
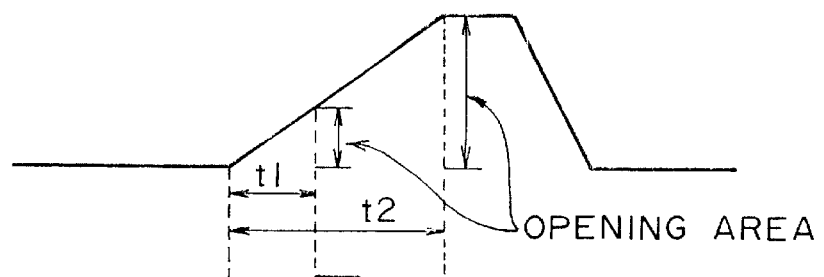
FIGS. 2(a), 2(b), 2(c), 2(d), and 2(e) are time charts showing a relationship between an open timing of a shutter and a strobe-flash timing.
Figure 2B:
Figure 2C:

How to adjust the exposure will be explained with reference to the time chart in FIG. 2. The time chart in FIG. 2 shows how much exposure can be obtained by flashing the strobe 17 and at what timing after the shutter 19 starts working. As shown in FIG. 2(a), the opening area of the shutter 19 is still small when the strobe light is flashed when a time t1 has passed after the shutter starts working (see FIG. 2(b)), and the quantity of light exposing the film is little. Therefore, the exposure is also small (see FIG. 2(c)).

Figure 2D:
Figure 2E:
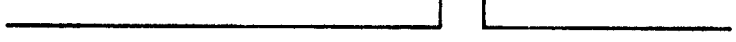

On the other hand, when the strobe light is flashed when a time t2 has passed after the shutter starts working (see FIG. 2(d)), the opening area of the shutter 19 is the largest, so the quantity of light which exposes the film is large. As a result, the exposure is almost twice as much as the exposure in the time t1 (see FIG. 2(e)). Thus, the flash timing of the strobe 17 is adjusted so that the exposure of the strobe 17 can be freely adjusted without changing the flash quantity of the strobe 17.

In this embodiment, the flash timing of the strobe light for obtaining the optimum exposure in photographing is controlled by a subject distance between the camera and the main subject measured by the light projector 14 and the light acceptor 16, the reflectance of the main subject, and the external light brightness within the photographic visual field measured by the photometry part 18 (an external light brightness).

Figure 3:
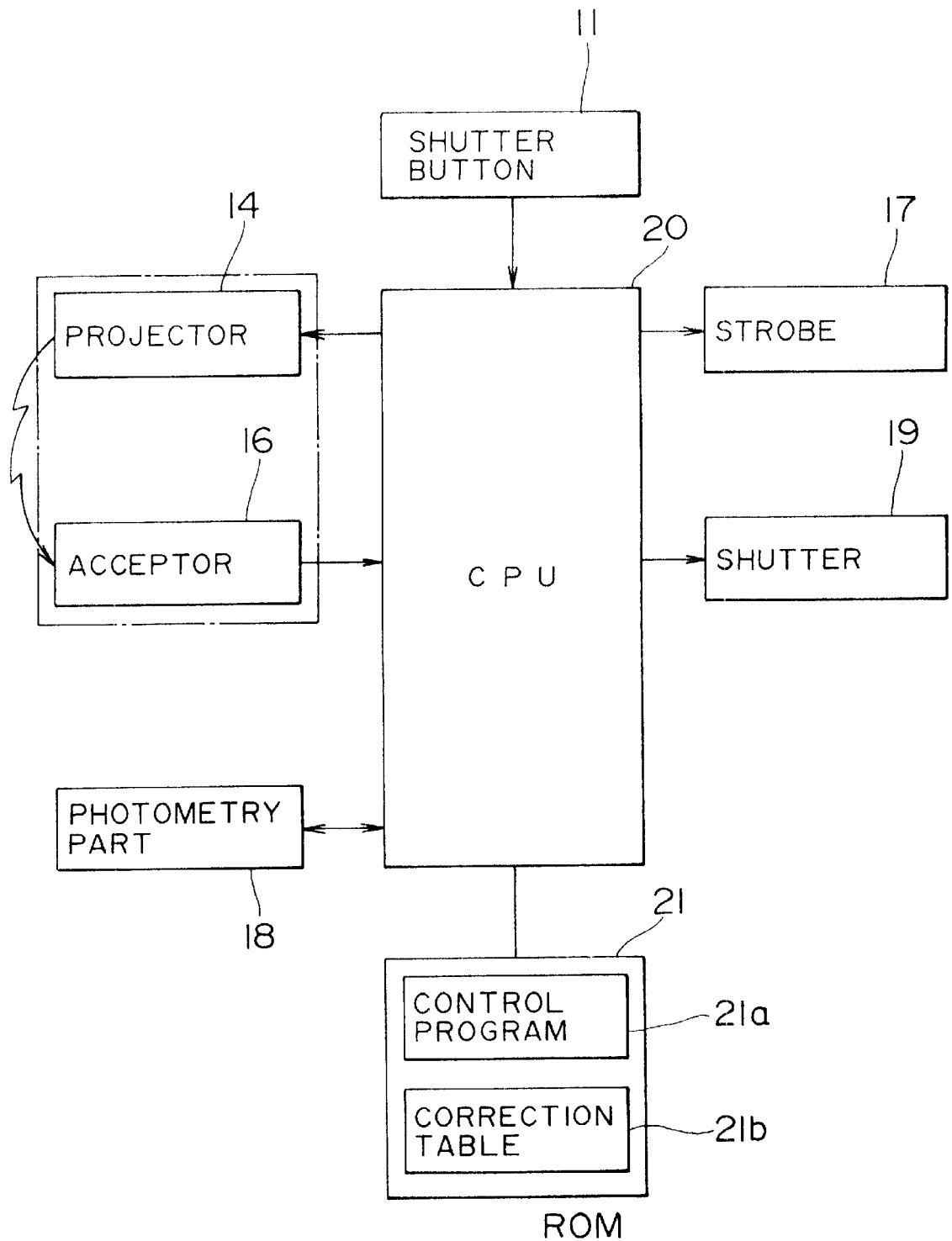
FIG. 3 is a block diagram illustrating a specific structure for controlling a strobe-flash timing.

FIG. 3 is a block diagram illustrating a specific structure for controlling a flash timing. As shown in the drawing, the flash timing is controlled mainly by a CPU 20 based on a control program 21a, which is written in a ROM 21.

The CPU 20 receives a half-push signal or a full-push signal from the shutter button 11. When the CPU 20 has received the half-push signal from the shutter button 11, the CPU 20 provides the light projector 14 with a signal for measuring the subject distance, and provides the photometry part with a signal for measuring the brightness of the external light within the visual field. The light projector 14 (and the light acceptor 16) and the photometry part 18 perform the focusing and the photometry, respectively, on the basis of the above-mentioned signals. They transmit the measurement results to the CPU 20. Moreover, when the CPU 20 has received the full-push signal, the CPU 20 provides the strobe 17 with a signal for flashing, and provides the shutter 19 with a signal for opening and closing the shutter.

Figure 4:
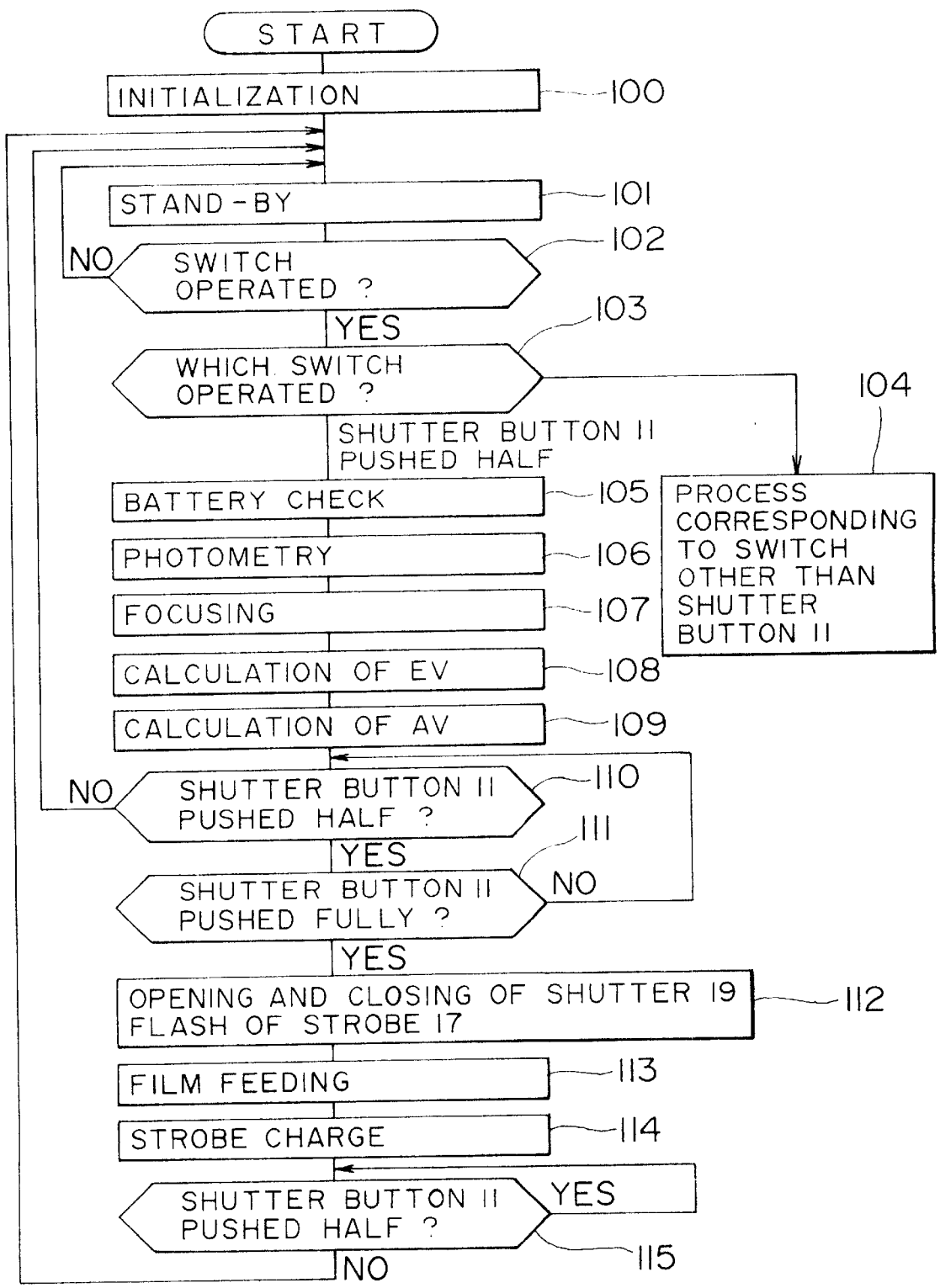
FIG. 4 is a flow chart showing a flow of processes in controlling a strobe-flash timing.

Next, an explanation will be given of a flow in a process of the flash timing control, which is performed based on the control program 21a by the CPU 20, with reference to the flow chart of FIG. 4.

First, when the power source switch is turned on, the initialization process such as clearing a memory stored in the CPU 20 and the setting of an I/O port is carried out (step 100). Then, the process waits until some switch is activated (step 101). There are a self-timer switch, a zoom switch (not shown), and the like in addition to the shutter button 11. When one of the switches is activated (step 102), it is detected which switch has been activated (step 103). If the switch other than the shutter button 11 has been activated, the process is executed for each switch (step 104).

When it is detected in step 103 that the shutter button 11 has been pushed half, the residual capacity of the power source electronic battery is checked (step 105). Next, the signal from the CPU 20 is transmitted to the photometry part 18, and the external light brightness within the photographic visual field is measured at the photometry part 18 (step 106). Furthermore, the signal from the CPU 20 is transmitted to the light projector 14, and the subject distance is measured by the light projector 14 and the light acceptor 16 (step 107). Then, an apex value (BV) of the external light brightness, which was found in step 106, and an apex value (SV) of the film sensitivity are used in the following equation (1), so that an exposure value EV, which is a control value for the shutter 19, can be calculated (step 108).

$$EV=SV+BV \tag{1}$$

A combination of a shutter speed and a stop value is set in order to obtain the exposure required for photographing by the calculation of the EV value.

Next, an AV value for setting a timing, at which the strobe 17 is flashed, is calculated (step 109). The AV value corresponds to the opening area of the shutter 19 when the strobe 17 is flashed. That is, if the value is found, it can be judged in what opening area, which increases gradually after the shutter starts working, the strobe 17 should be flashed. Therefore, the flash timing of the strobe 17 can be found from the AV value.

In order to calculate the AV value, the subject distance (D), which is found in step 107, is used in an equation (2), and a guide number (G No.) is used in an equation (3) so that a DV value and a GV value can be found.

$$DV=-2\log_2 D \tag{2}$$

$$GV=2\log_2 GNo. \tag{3}$$

Figure 5:
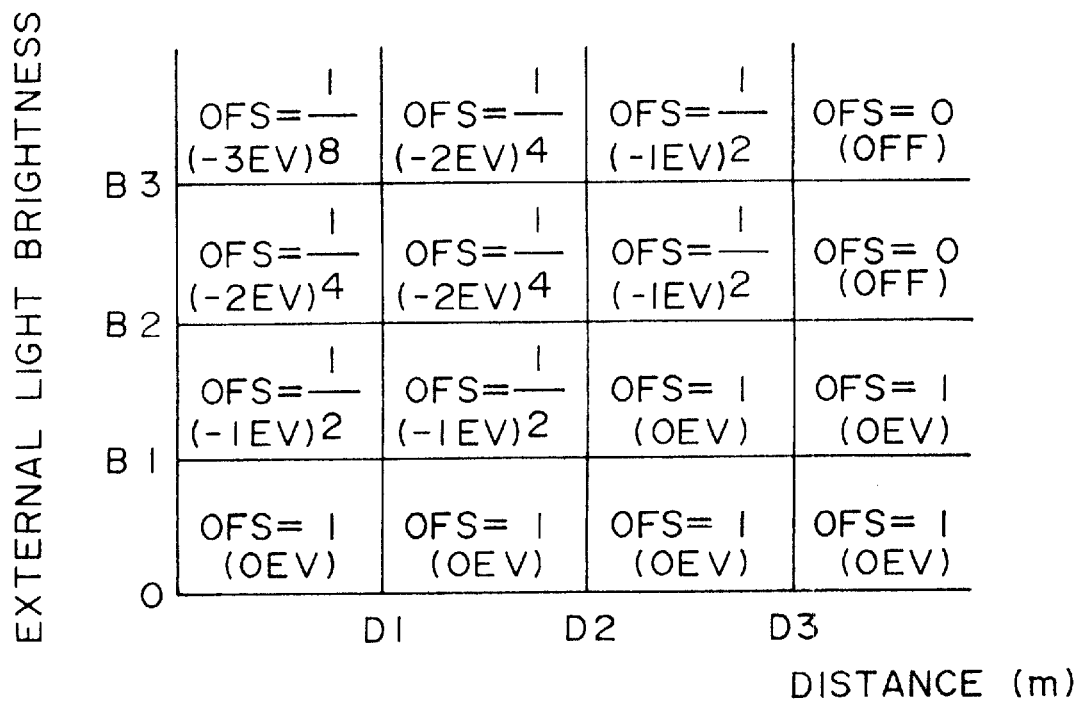
FIG. 5 is a view illustrating one example of a correction table.

Next, an OFS value, which is a correction value, is found from the correction table 21b, which is written in the ROM 21. FIG. 5 is a view illustrating one example of the correction table for a film sensitivity ISO 100 (SV=5). The correction values are allotted on the table, with the external light brightness and the subject distance being a parameter. In this example, the external light brightness is classified into 4 levels (-B1, B1-B2, B2-B3, B3-), and the subject distance is classified into 4 levels (-D1, D1-D2, D2-D3, D3-) (incidentally, B1>B2>B3, D1>D2>D3). The OFS value, which is a correction value of the exposure of the strobe 17, is allotted to each level (see FIG. 5). Basically, when the external light brightness is B1 or less, the external light brightness is not sufficient for the required exposure. So, the correction value OFS=1, in which the exposure of the strobe 17 does not decrease, is allotted. When the external light brightness is B1 or more, the correction value OFS= ¾–⅛, in which the exposure of the strobe 17 decreases, is allotted. In this case, the decrease quantity is adjusted so as to become greater when the subject distance is shorter.

Incidentally, a 0 EV flash means a flash in such a state that the strobe exposure is 100% which is required for photographing. In the case of a -1 EV flash, a -2 EV flash, and a -3 EV flash; the strobe exposure is 50%, 25%, and 12.5%, respectively.

The OFS value can be found from the correction table 21b from the external light brightness, which is measured in step 106, and the subject distance, which is measured in step 107. For example, when the distance is D1-D2 and the brightness is B2-B3, the OFS is ¼ (-2 EV). When the distance is more than D3, and the brightness is B1-B2, the OFS is 1. The OFS value is used in the following equation (4) so that the FL value can be found.

$$FL=\log_2 OFS \tag{4}$$

The DV value, the GV value, the FL value, and the film sensitivity (SV), which are found from the above-mentioned equations (1), (2), (3), and (4), are used in the following equation (5), so that the AV value can be found (Step 109).

$$AV=GV+SV+DV+FL+5 \tag{5}$$

Incidentally, the film sensitivity and the SV value are in a ratio of ISO 100, 200, 400, 800, 1600 . . . to SV 5, 6, 7, 8, 9 . . . .

Next, the shutter button 11 is further pushed from the half-push state, and the process waits until the button 11 is fully pushed (Steps 110 and 111). If the button is not fully pushed and the finger is removed from the shutter button 11, the processing returns to step 101. If the shutter button 11 is fully pushed, the shutter 19 is opened and closed for photographing. The opening and closing of the shutter 19 is controlled based on the EV value calculated in the step 108. Then, the strobe 17 flashes at a timing which the opening area of the shutter 19 equals to the AV value calculated in step 109 (step 112). The exposure required for photographing can be obtained by the flash of the strobe 17.

The film feeds (step 113) after the shutter 19 is closed, and the strobe 17 is electrically charged (step 114). Then, while the shutter button is being half pushed, the process waits (step 115), and the process returns to step 101 after the finger is removed from the shutter button 11.

FIGS. 6, 7, 8 and 9 show a film sensitivity interlock changeover tables. These tables are made by enlarging the correction table with regard to ISO 100 in FIG. 5. Each film sensitivity interlock changeover table corresponds to each distance (-D1, D1-D2, D2-D3, D3-) For example, D1 is 1.3 m, D2 is 2 m, and D3 is 9 m.

Figure 6:
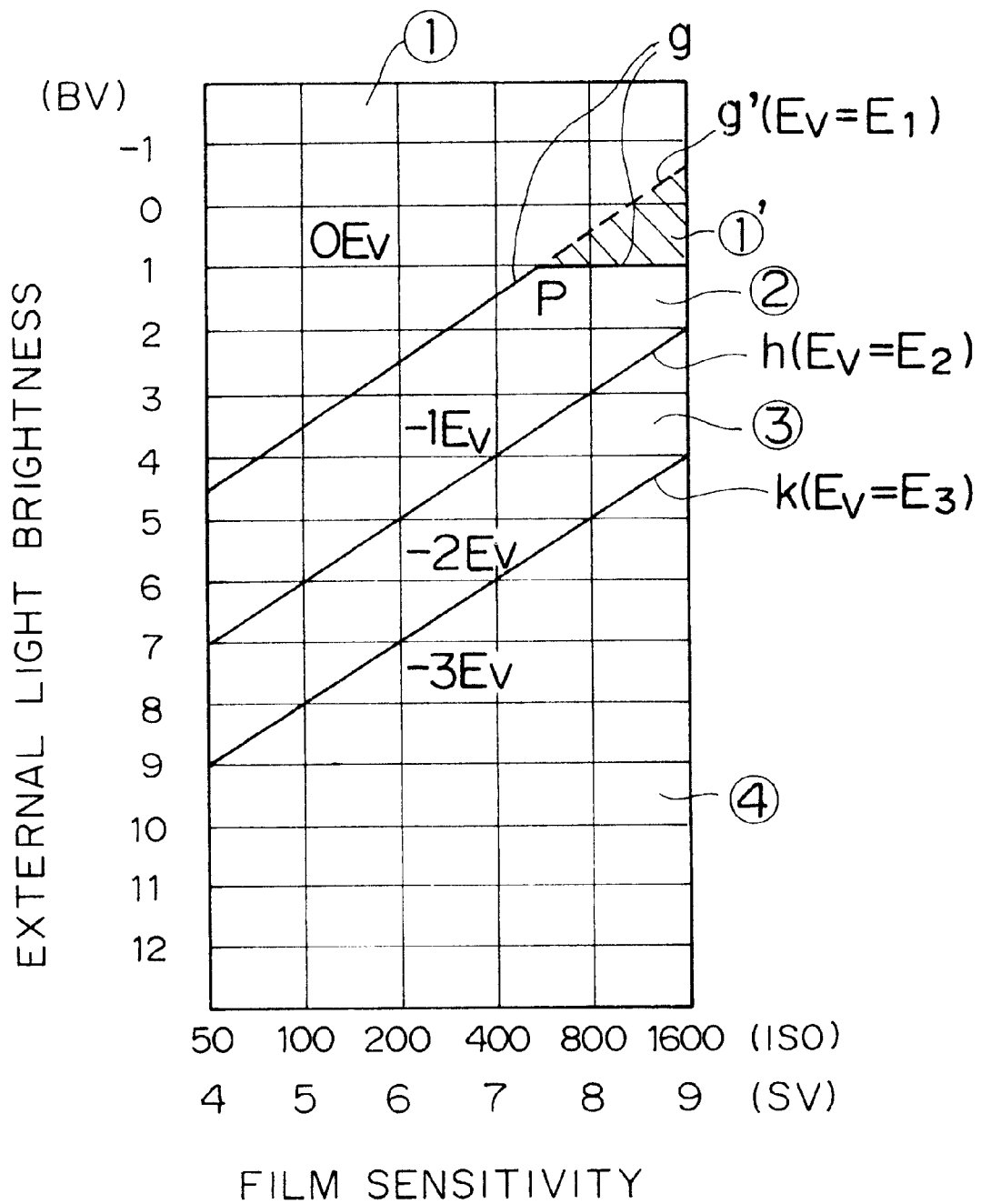
FIG. 6 is a view illustrating a film sensitivity interlock changeover table when a subject distance is D1 or less.

FIG. 6 is a film sensitivity interlocking changeover table in the case when the distance is D1 or less. The horizontal axis indicates a film sensitivity, and a vertical axis indicates an external light brightness BV. A point on the quadrant indicates an exposure value EV. When the exposure value is in an area (1) (a part indicated by slanted lines) over a fold straight line g in the drawing (low brightness side), the 0 EV flash is performed. When the exposure value is in an area (2) between a straight line g and a straight line H, the −1 EV flash is performed. When the exposure value is in an area (3) which is between the straight line H and a straight line k, the −2 EV flash is performed. When the exposure value is in an area (4) below the straight line k (high brightness side), the −3 EV flash is performed.

This embodiment is characterized in that a line g, which shows the exposure value for changing over 0 EV and −1 EV, is not a straight line as shown with a dot line g', but a fold line, which is folded at a point P in the drawing.

In the conventional strobe changeover by an EV interlock, only if the external light brightness, which turns on and off the strobe, is shifted, this is applied to different film sensitivity. For example, a line indicating the exposure value for changing over the 0 EV flash and the −1 EV flash is a straight line as shown with the dot line g'. That is, when the exposure value is in an area between the dot line g' and the fold straight line g, the −1 EV flash is performed.

However, the above-mentioned conventional control has a problem in that the color fades because of the spectral characteristics of the external light source (e.g. a fluorescent light), although the exposure required for photographing can be obtained. This problem was described previously.

Accordingly, in this embodiment, when the external light brightness is BV 1 or less, the 0 EV flash is performed regardless of the film sensitivity. When the exposure value is in the area (1)', the 0 EV flash is compulsively performed, so that the strobe exposure can increase, and the contribution rate of the external light exposure can lower relatively. As a result, the influence by the spectral characteristics of the external light source reduces. For example, when the external light brightness is BV 1 or less, the 0 EV flash is performed, even if the film sensitivity is ISO 800.

Originally, when the exposure value becomes high, the changeover control (=1 EV flash) wherein the strobe exposure decreases to 50%, so that the total light exposure on the image surface can be prevented from being overexposed. However, as for the above-mentioned area (1)', the strobe exposure is purposely kept at 100% so as to be overexposed. As a result, the color fading caused by the external light source can be prevented.

Figure 7:
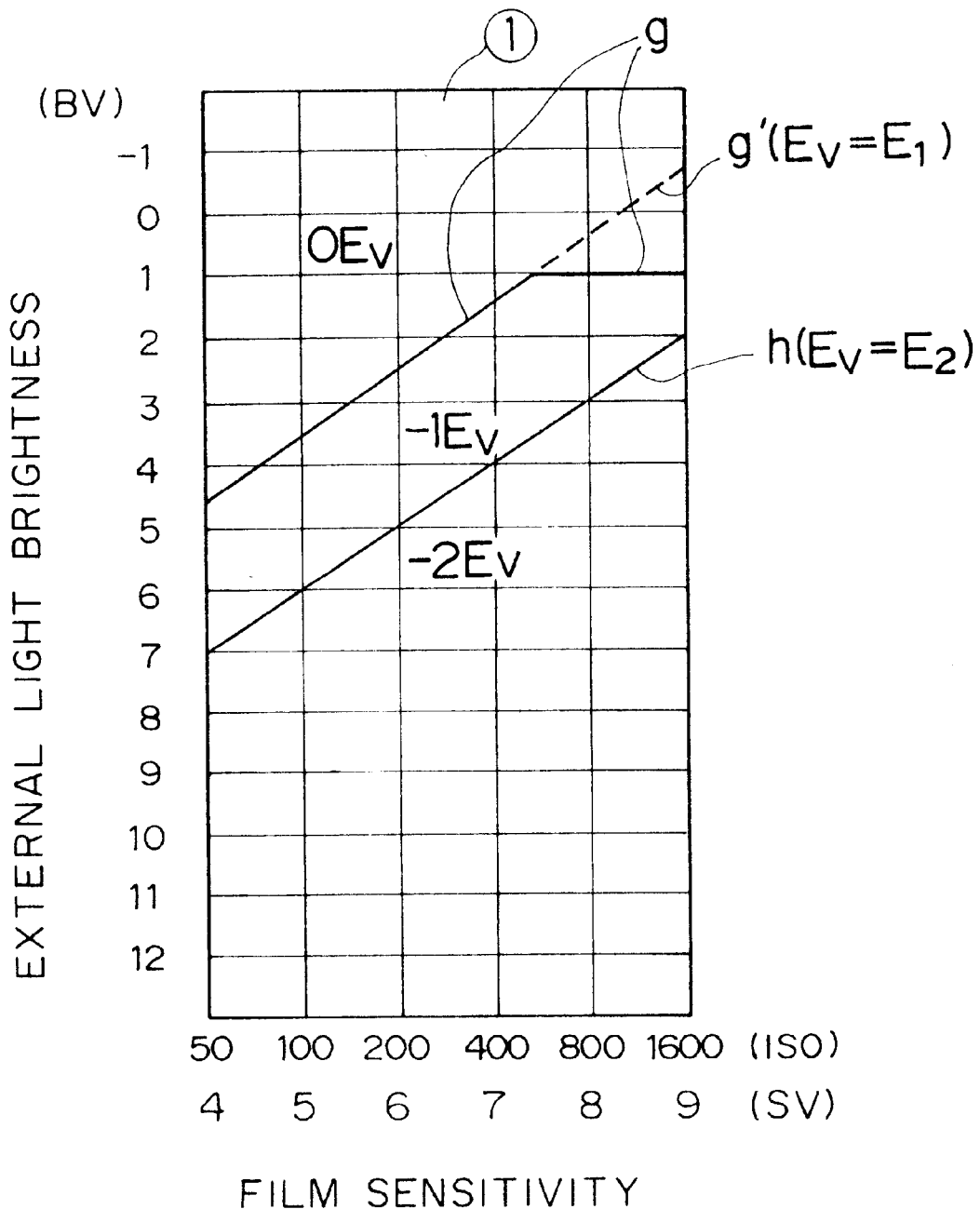
FIG. 7 is a view illustrating a film sensitivity interlock changeover table when a subject distance is D1–D2.

FIG. 7 illustrates a film sensitivity interlock changeover table in the case of the distance D1–D2. This is almost the same as FIG. 6. However, FIG. 7 is different from FIG. 6 in that the detailed process such as decreasing the exposure of the strobe 17 to −3 EV is not performed, even if the external light brightness becomes high and the exposure value reaches EV 13.

Figure 8:
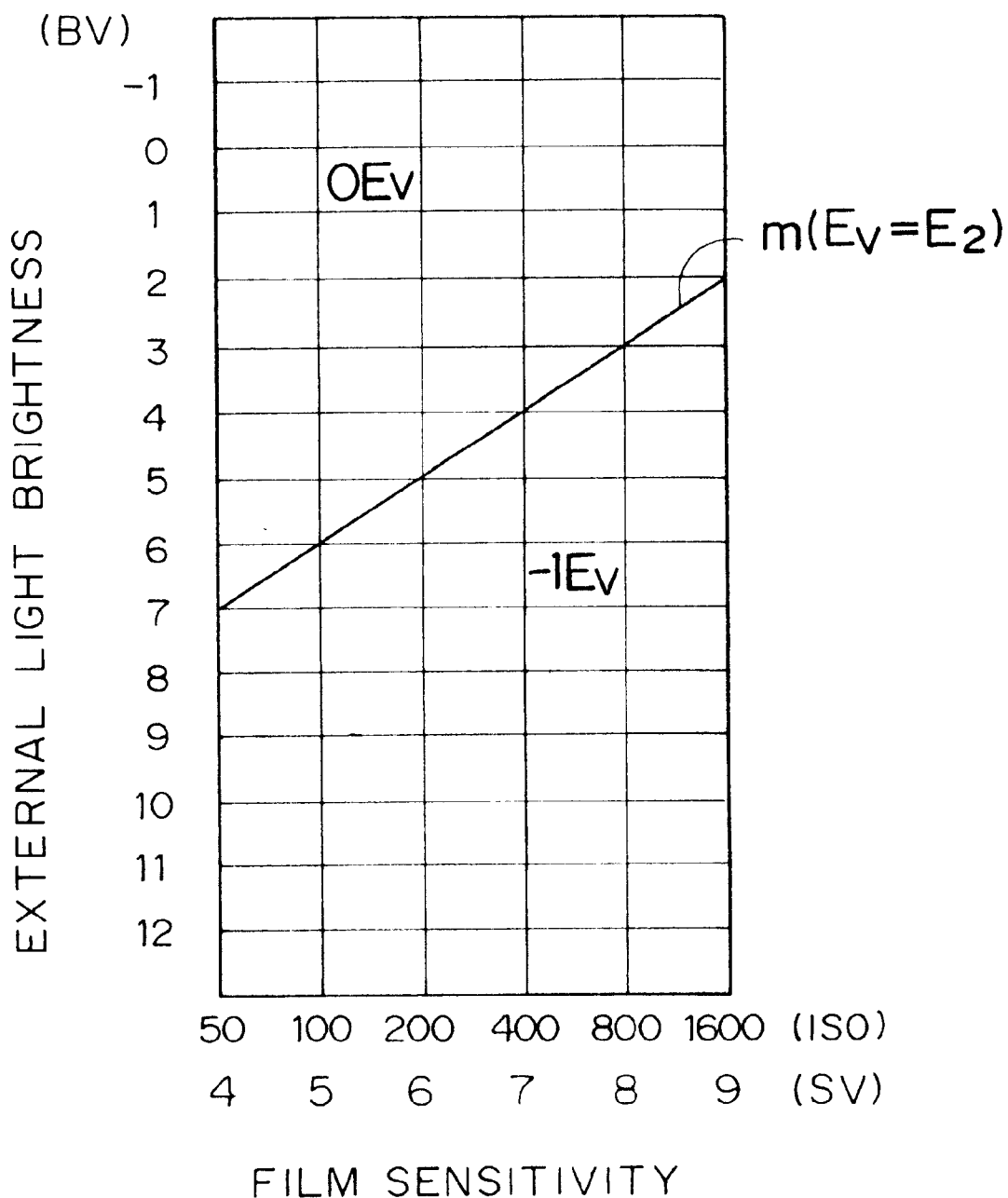
FIG. 8 is a view illustrating a film sensitivity interlock changeover table when a subject distance is D2–D3.

FIG. 8 illustrates a film sensitivity interlock changeover table in the case of the distance D2–D3. The 0 EV light emission is performed in an area over a straight line m (low brightness side), and the −1 EV flash is performed in an area below the straight line m (high brightness side). In FIG. 8, the 0 EV flash is not performed compulsively as in FIGS. 6 and 7. The 0 EV flash is performed in the area of the high sensitivity and the low brightness.

Figure 9:
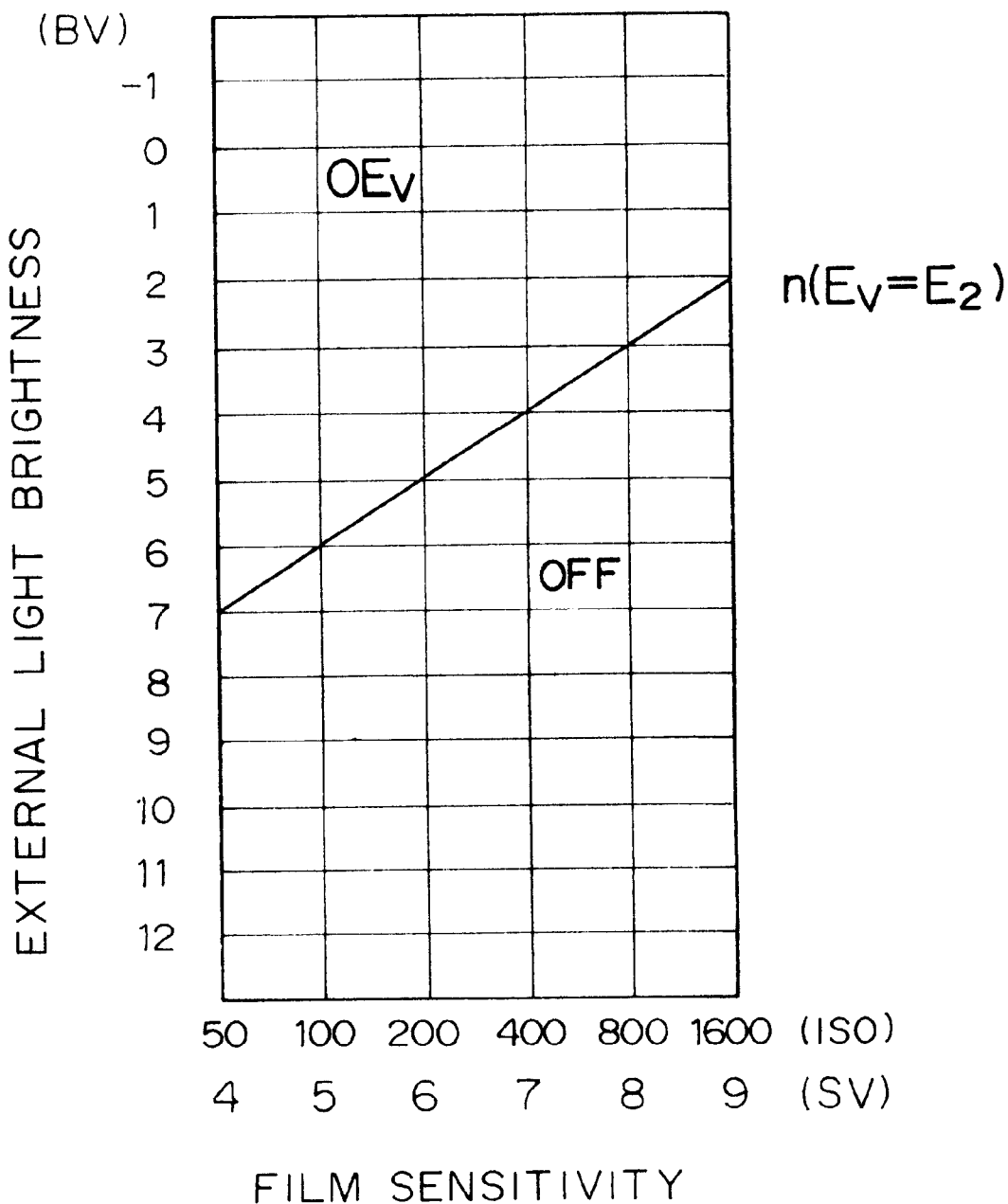
FIG. 9 is a view illustrating a film sensitivity interlock changeover table when a subject distance D3 or more.

FIG. 9 illustrates a film sensitivity interlock changeover table in the case of the distance D3–. FIG. 9 is the same as FIG. 8 in that the exposure of the strobe 17 is 100% (the 0 EV flash is performed) in the area over the straight line n (low brightness side). However, FIG. 9 is different from FIG. 8 in that the flash of the strobe 17 is controlled to stop (OFF) in the area below the straight line n (high brightness side).

Next, an explanation will be given of a relationship between the exposure of the strobe 17, which is corrected by the film sensitivity interlock changeover tables in FIG. 6, 7, 8 and 9, and the external light exposure, with reference to graphs in FIGS. 10, 11, 12, 13, 14 and 15.

Figure 10:
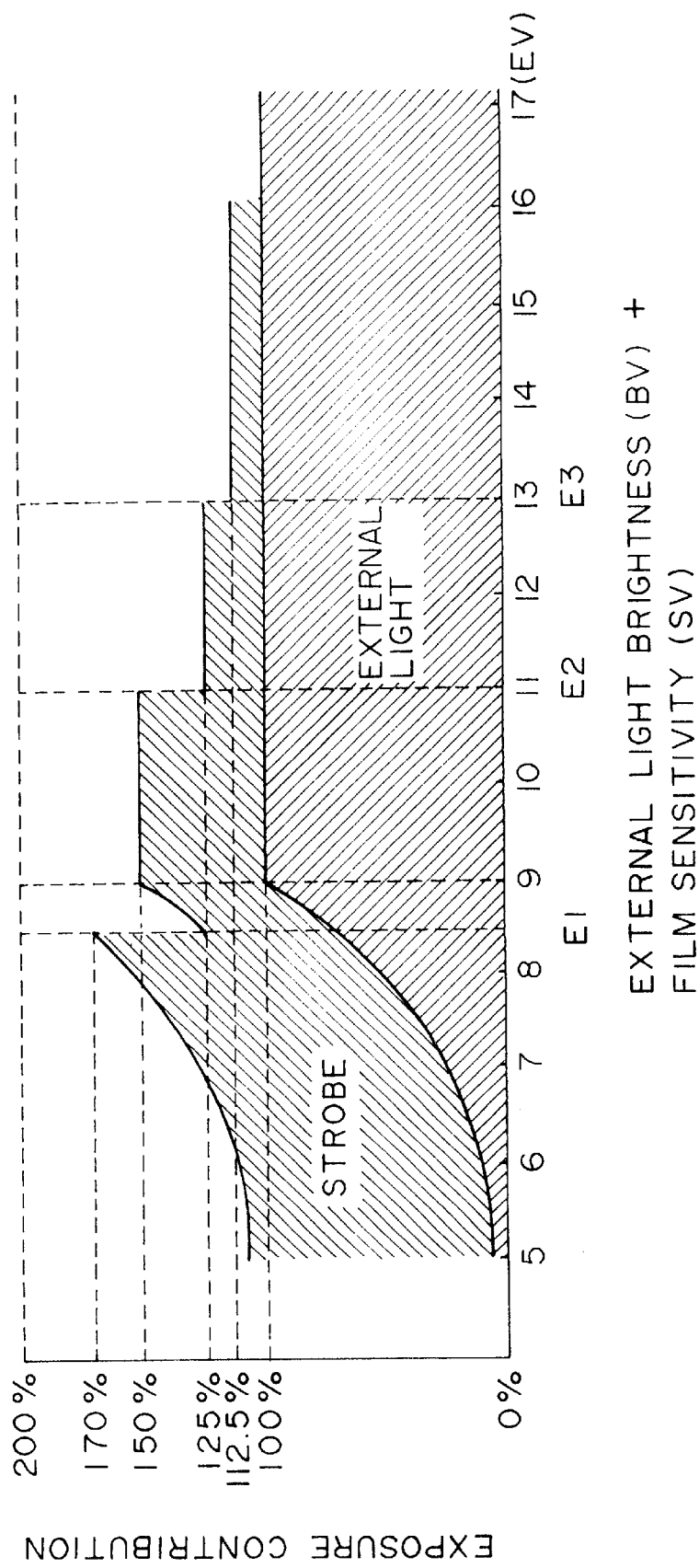
FIG. 10 is a view illustrating a relationship between a strobe exposure and an external light exposure within a photographing visual field when a subject distance is D1 or less in the case of a film sensitivity ISO 100.

FIG. 10 is a graph showing a relationship between the exposure of the strobe 17 and the external light exposure when the subject distance is D1 or less and the film sensitivity is ISO 100 (SV=5). In the drawing, the horizontal axis indicates an EV value (exposure value), which is the of sum of the external light brightness (BV) and the film sensitivity (SV). The SV is 5 in this case, the exposure value indicated with the horizontal axis is considered to be the external light brightness. The exposure values corresponding to B1, B2 and B3 in FIG. 5, are E1, E2 and E3, respectively.

As shown in FIG. 10, when the exposure value is EV 9 or less (the external light brightness is BV 4), the time in which the shutter 19 opens is the limit for a shake prevention and is fixed. Therefore, the 100% exposure required for photographing cannot be obtained only by the external light. That is, EV 9 is the brightness at the limit to which a so-called AE automatic control.

Accordingly, the exposure of the external light continues to increase until the exposure value reaches EV 9. Then, when the exposure value reaches EV 9 or more, the AE automatic control is performed so as to control the shutter 19, and the external light exposure is controlled to be kept at 100%. Therefore, if the external light brightness is BV 4 or more (the exposure value is EV 9 or more), the external light exposure is constant.

On the other hand, when the external light brightness is B1 or less, that is, when the exposure value is E1 or less, the exposure of the strobe 17 is 100% as required for photographing. As the external light brightness increases, OFS=1 (0 EV), OFS=½ (−1 EV), OFS=¼ (−2 EV), and OFS=⅛ (−3 EV) are allotted to the correction table 21b with regard to the external light brightness −E1, E1–E2, E2–E3, and E3–, respectively.

The total exposure on the film is represented by the sum of the external light exposure and the strobe exposure. When the exposure value is E1 in a state that the exposure contribution rate by the external light is gradually increasing, the strobe exposure is changed so that the exposure contribution rate by the strobe can decrease. That is, in the case of the changeover exposure value E1 in FIG. 6, the changeover control is performed to decrease the exposure contribution rate of the strobe to 50%. As a result, the total exposure can be prevented from being overexposed.

Therefore, when the exposure value is in a near proximity of EV 9, that is the limit to which the AE automatic control can be performed (the external light brightness is BV 4), the strobe exposure can be prevented from being overexposed. At the same time, the subject surface and the background can be well balanced in their quantity of light, and the subject can be prevented from appearing in white.

Furthermore, in the area of the external light brightness wherein the exposure value is EV 9 or more, the exposure of the strobe 17 gradually decreases as the external light brightness becomes high. That is, the exposure contribution rate is 50% in E1–E2, the exposure contribution rate by the strobe is 25% in E2–E3, and the exposure contribution rate by the strobe is 12.5%. Thus, the exposure contribution rate by the strobe decreases gradually.

When strobe 17 is flashed so that the strobe exposure can be fixed, a ratio of the background to the main subject in the quantity of light lowers, and a photograph wherein the background looks dark is taken, even if the external light brightness is high. In this embodiment, the exposure of the strobe 17 decreases gradually as the external light brightness becomes high. So, the ratio of the background to the subject in the quantity of light does not lower. Therefore, a photograph, in which the background does not look dark, can be taken even in the high brightness, and the atmosphere in the photograph is not ruined. Incidentally, even if the subject distance is D1 or more as described later, the exposure of the strobe 17 is adjusted to decrease gradually as the external light brightness becomes high. As a result, the same result can be achieved even if the subject distance is far.

Further, if the subject distance is D1 or less, the exposure of the strobe 17 is extremely little (the exposure contribution rate 12.5%) when the exposure value is E3 or more (the external light brightness is B3). That is because the subject surface and the background is not well balanced in their quantity of light, and the subject tends to appear in white on the photograph because an area covered by the main subject ks larger than the background in a short distance photographing. In this embodiment, when the distance is near and the external light brightness is high, the quantity of the strobe light is controlled to be extremely small, so the subject surface and the background can be well balanced, and the subject can be prevented from appearing in white on the photograph.

Figure 11:
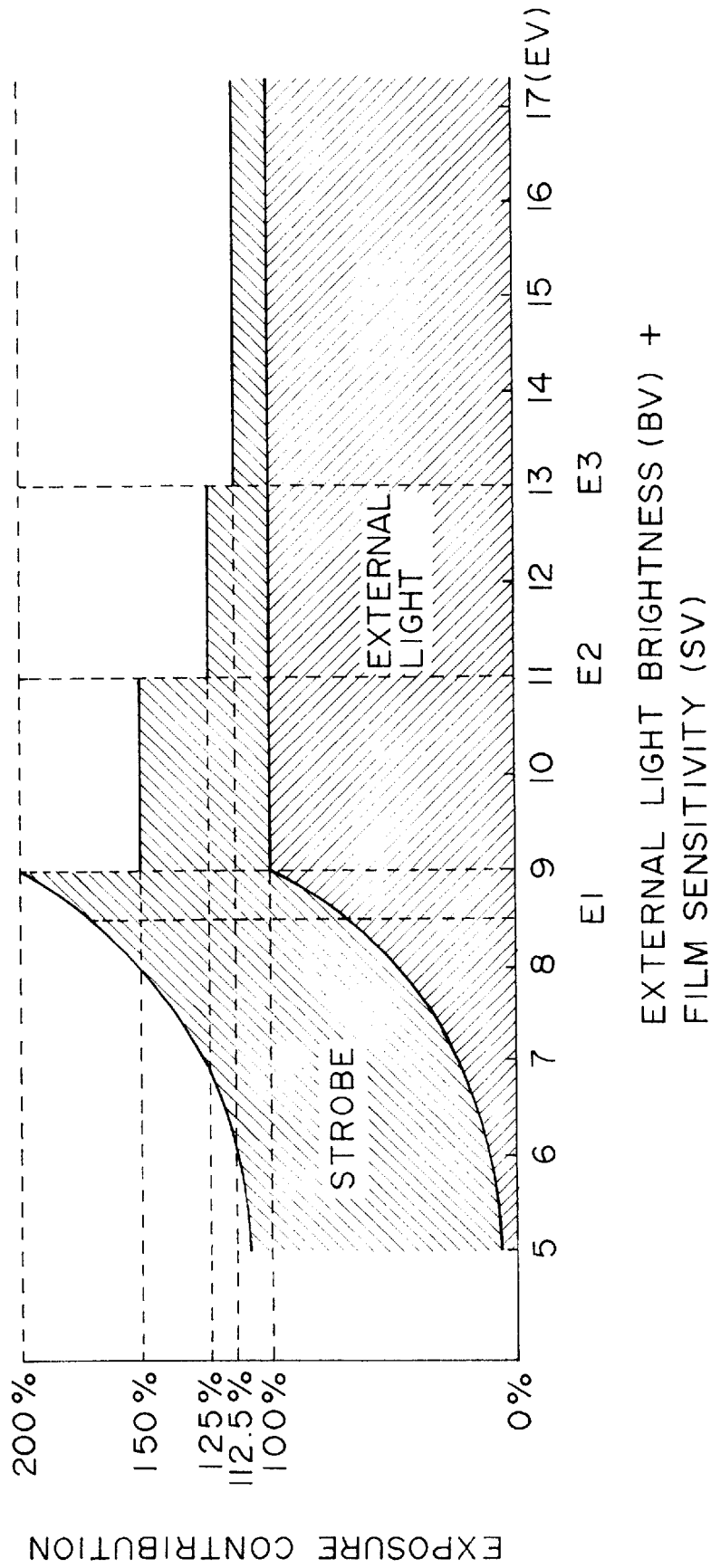
FIG. 11 is a view illustrating a relationship between a strobe exposure and an external light exposure within a photographing visual field when a subject distance is D1 or less in the case of a film sensitivity ISO 800.

FIG. 11 is a graph in the case when the film sensitivity is ISO 800 in FIG. 10. FIG. 11 is the same as FIG. 10 except for that the 0 EV flash is performed compulsively until the exposure value reaches EV 9 as has been explained with reference to FIG. 6. Therefore, the exposure contribution rate by the external light can be reduced gradually, and the color fading caused by the external light source can be prevented.

Figure 12:
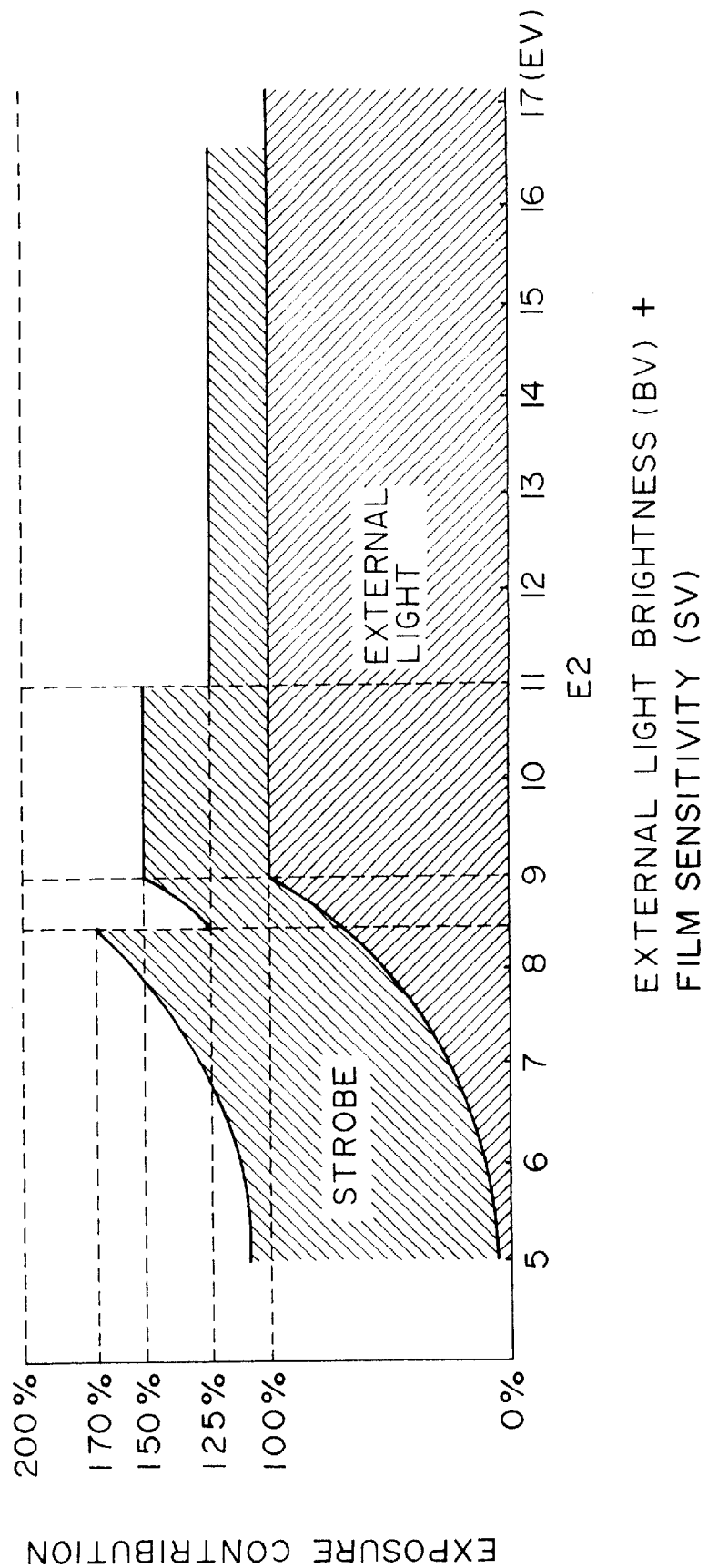
FIG. 12 is a view illustrating a relationship between a strobe exposure and an external light exposure within a photographing visual field when a subject distance is D1–D2.

FIG. 12 is a graph showing a relationship between the exposure of the strobe 17 and the external light exposure when the film sensitivity is ISO 100 (SV=5) and the subject distance is D1–D2. As shown in FIG. 12, the external light exposure is the same as that of FIG. 10. On the other hand, although the exposure by the strobe 17 is the same as that of FIG. 10 when the exposure value is E3 or less. However, FIG. 10 is different from FIG. 12 in that a detailed process such as decreasing the exposure of the strobe 17 to ½ even when the exposure value is E3 or more. That is because there is no problem in that the subject surface and the background are not well balanced in their quantity of light when the external light brightness is high, if the subject distance is between D1 and D2.

Incidentally, a graph corresponding to FIG. 12 in the case of the film sensitivity ISO 800 is not shown; however, the exposure is not further decreased to ½ when the exposure value is E3 or more in FIG. 11.

Figure 13:
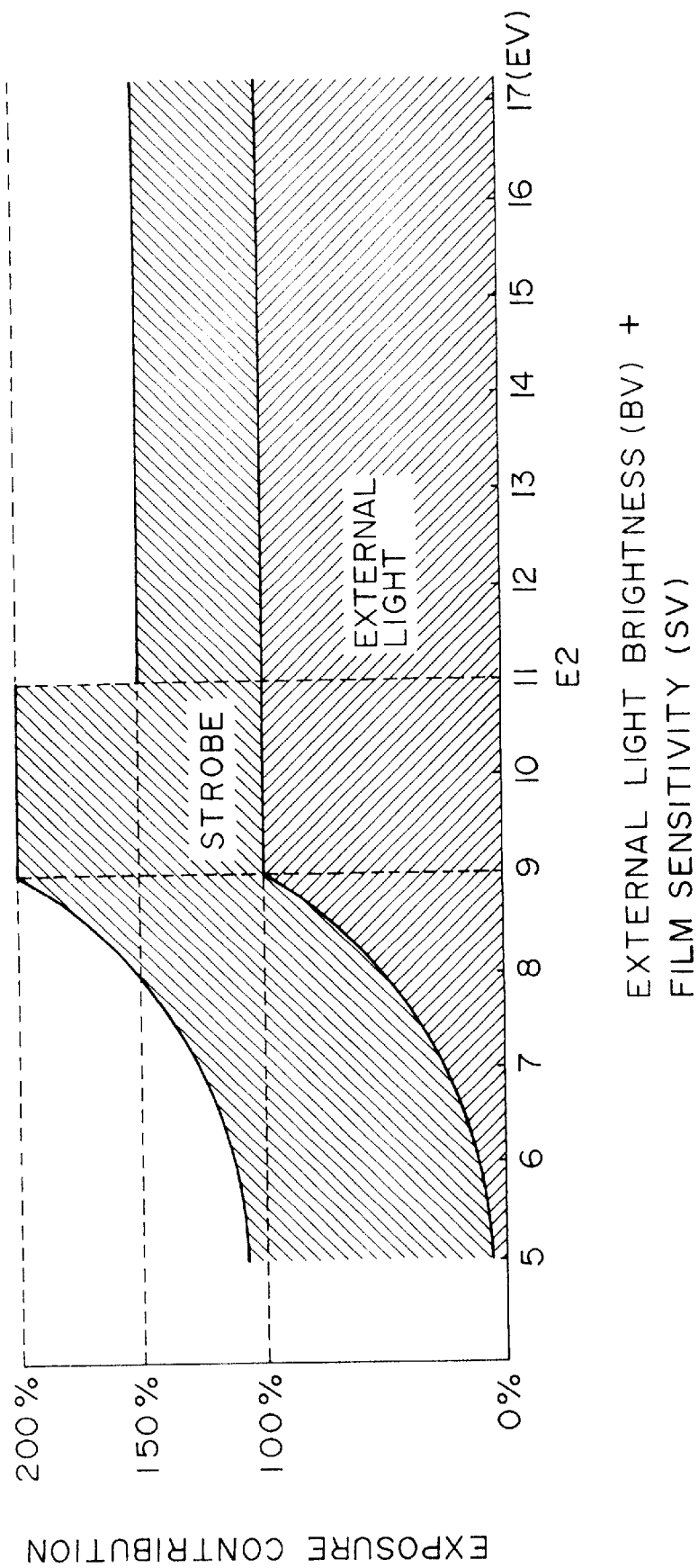
FIG. 13 is a view illustrating a relationship between a strobe exposure and an external light exposure within a photographic visual field when a subject distance is D2–D3.

FIG. 13 is a graph showing a relationship between the exposure of the strobe 17 and the external light exposure when the film sensitivity is ISO 100 (SV=5) and the subject distance is D2–D3. FIG. 13 is different from FIG. 12 in that the exposure of the strobe 17 does not decrease even if the exposure value reaches E1, and the exposure of the strobe 17 is kept at 100% until the exposure value reaches E2, and that a detailed process such as decreasing the exposure of the strobe 17 to ½ even if the exposure value reaches E3.

That is because the effect is not remarkable compared to the short distance area as shown in FIGS. 10 and 12, even if the exposure of the strobe 17 is decreased in the case of the exposure value of EV 9 or less, when the subject distance is longer than that of FIG. 12, that is, D2 or more. Moreover, even if the total exposure is overexposed in the whole area of the external light brightness, there is no problem in that the subject surface and the background is not well balanced in their quantity of light as mentioned above.

FIG. 14 is a graph showing a relationship between the exposure by the strobe 17 and the external light exposure when the subject distance is D3 or more. In this case, the film sensitivity is ISO 100. FIG. 14 is the same as FIG. 13 in that the exposure of the strobe 17 is kept at 100% until the exposure value reaches E2. However, FIG. 14 is different from FIG. 13 in that the flash of the strobe 17 is controlled to stop (OFF) when the exposure value reaches E2 or more. When the subject distance is D3 or more and the exposure value is E2 or more, the quantity of the strobe light reaching the subject is extremely small, so the photographing is hardly influenced when the flash of the strobe 17 stops.

Incidentally, when the distance is D2 or more, the graph in the case of ISO 800 is the same as FIGS. 13 and 14.

In this embodiment, the correction table 21b of FIG. 5 has been explained. However, the correction table is not limited to this embodiment. The external light brightness and the subject distance can be classified into more or less levels than the correction table 21b of FIG. 5.

Incidentally, the present invention is not limited to the above-described embodiment, and the various modifications are possible. For example, in this embodiment, the flash timing of the strobe 17 is slightly staggered from the shutter timing as shown in FIG. 2 so that the exposure can be adjusted. However, the flash timing of the strobe 17 can be fixed, and the flash quantity itself is changed so that the exposure can be adjusted.

Furthermore, the measurement of the subject distance is performed in an active method by means of the light projector 14 and the light acceptor 16; however, a passive method can be adopted.

As has been described above, according to the built-in flash camera of the present invention, when the strobe exposure is controlled, based on the exposure value (EV value), which is set by the brightness measured by the film sensitivity and the photometry part, and the distance measured by the focusing part, the strobe exposure is controlled to be the standard strobe exposure when the brightness measured by the photometry means is less than a predetermined brightness, so that the ratio of the strobe exposure to the external light exposure can become higher. As a result, the exposure contribution rate of the external light can be lowered relatively when the high-sensitivity film is used, and the color fading caused by the spectral characteristics of the external light source can be prevented. Thus, when the high-sensitivity film is used, the color can always be reproduced well, and a good picture can be taken.

It should be understood, however, that there is no intention to limit the invention to the specific forms disclosed, but on the contrary, the invention is to cover all modifications, alternate constructions and equivalents falling within the spirit and scope of the invention as expressed in the appended claims.

We claim:

1. A built-in flash camera, comprising:
   photometry means for measuring brightness within a photographic visual field;
   an automatic exposure mechanism for opening and closing a diaphragm shutter so that a standard exposure can be obtained when the photographing is performed, said standard exposure being based on the brightness measured by the photometry means, said standard exposure resulting in an optimum exposure for a predetermined shutter opening size and speed; and strobe light control means, which flashes regularly, interlocking with the opening and closing of the shutter, for controlling an exposure by the flash in accordance with an exposure value determined by the brightness measured by the photometry means and a film sensitivity;

wherein the strobe light control means controls the strobe exposure to be a reference strobe exposure when the exposure value is less than a predetermined exposure value, controls the strobe exposure to be relatively decreased from the reference strobe exposure as the exposure value relatively increases, and controls the strobe exposure to remain at the reference strobe exposure when the brightness measured by the photometry means is less than the predetermined brightness regardless of the film sensitivity, the reference strobe exposure being an exposure required for photographing using only the strobe light.

2. The built-in flash camera according to claim 1, wherein the predetermined brightness is an apex value (BV) 1, which is a brightness of the main subject.

3. The built-in flash camera according to claim 1, wherein said strobe light control means controls the strobe exposure using means for adjusting at least one of a strobe flash timing and an open/close timing of the shutter.

4. The built-in flash camera according to claim 1, wherein said strobe light control means controls the strobe exposure using means for adjusting a flash quantity of the strobe.

5. The built-in flash camera according to claim 1, wherein the predetermined brightness is a brightness in which a quantity of light required for photographing is obtained when a high-sensitivity film of more than ISO 800 is used, even if the strobe exposure is decreased from the reference strobe exposure.

6. The built-in flash camera according to claim 1, wherein the predetermined film sensitivity is ISO 800, and the predetermined brightness is an apex value (BV) 1, which shows a brightness of a subject.

7. The built-in flash camera according to claim 1, wherein the strobe light control means keeps the strobe exposure at the reference strobe exposure when the film sensitivity is more than a predetermined sensitivity and the brightness measured by the photometry means is less than the predetermined brightness regardless of the film sensitivity, wherein the predetermined sensitivity is such that a quantity of light required for photographing can be secured even if the strobe exposure is decreased from the reference strobe exposure when the photographing is performed under the predetermined brightness, wherein such a decrease from the reference strobe exposure results in color fading due to spectral characteristics of a florescent light providing the brightness within the photographic visual field, when the photographing is performed under the strobe exposure which is decreased from the reference strobe exposure.

8. The built in flash camera of claim 1, further comprising:
focusing means for measuring a distance to a main subject within the photographic visual field; wherein the strobe light control means controls the strobe exposure based upon the distance measured by the focusing means.

9. The built in flash camera of claim 1, wherein the strobe light control means controls the strobe exposure to be relatively decreased by a predetermined amount from the reference strobe exposure in conjunction with relatively increasing ranges of the exposure value.

10. A method of providing a flash to a camera comprising the steps of:

measuring a brightness within a photographic visual field;

opening and closing a diaphragm shutter so that a standard exposure can be obtained when the photographing is performed, said standard exposure being based on the brightness, said standard exposure resulting in an optimum exposure for a predetermined shutter opening size and speed; and controlling an exposure by the flash in accordance with an exposure value determined by the brightness measured by the photometry means and a film sensitivity, including
maintaining the strobe exposure to be a reference strobe exposure when the exposure value is less than a predetermined exposure value, the reference strobe exposure being an exposure required for photographing using only the strobe light,
relatively decreasing the strobe exposure from the reference strobe exposure as the exposure value relatively increases, and
maintaining the strobe exposure at the reference strobe exposure when the brightness is less than the predetermined brightness, regardless of film sensitivity.

11. The method according to claim 10, further comprising setting the predetermined brightness to an apex value (BV) 1, which is a brightness of the main subject.

12. The method according to claim 10, wherein said controlling step includes adjusting at least one of a strobe flash timing and an open/close timing of the shutter.

13. The method according to claim 10, wherein controlling step includes adjusting a flash quantity of the strobe.

14. The method according to claim 10, wherein the maintaining the strobe exposure step keeps the strobe exposure at the reference strobe exposure when the film sensitivity is more than a predetermined sensitivity and the brightness measured by the photometry means is less than the predetermined brightness regardless of the film sensitivity, said method further comprising setting the predetermined sensitivity such that a quantity of light required for photographing can be secured even if the strobe exposure is decreased from the reference strobe exposure when the photographing is performed under the predetermined brightness, wherein such a decrease from the reference strobe exposure results in color fading due to spectral characteristics of a florescent light providing the brightness within the photographic visual field, when the photographing is performed under the strobe exposure which is decreased from the reference strobe exposure.

15. The built in flash camera of claim 8, wherein the predetermined exposure value is adjusted based upon the distance measured.

16. The method of claim 10, further comprising the step of:
measuring a distance to a main subject within the photographic visual field, wherein the strobe exposure is controlled based upon the distance measured.

17. The method of claim 16, wherein the predetermined exposure value is adjusted based upon the distance measured.

18. The method of claim 10, wherein strobe exposure is controlled to be relatively decreased by a predetermined amount from the reference strobe exposure in conjunction with relatively increasing ranges of the exposure value.

* * * * *